United States Patent [19]
Yamaki et al.

[11] Patent Number: 5,902,851
[45] Date of Patent: May 11, 1999

[54] RESINOUS COMPOSITION FOR FOUL RELEASING COAT AND COATING ARTICLES

[75] Inventors: Takeyuki Yamaki, Hirakata; Akiharu Gotoh; Minoru Inoue, both of Katano, all of Japan

[73] Assignee: Matsushita Electric Works, Ltd., Osaka, Japan

[21] Appl. No.: 08/840,167

[22] Filed: Apr. 14, 1997

[30] Foreign Application Priority Data

Dec. 24, 1996 [JP] Japan .................................. 8-343075

[51] Int. Cl.⁶ .............................................. C09D 133/064
[52] U.S. Cl. ......................... 524/506; 524/547; 524/558; 524/560; 524/561; 524/588; 525/100; 525/103
[58] Field of Search ..................... 524/506, 547, 524/558, 560, 561, 588; 525/103, 100

[56] References Cited

U.S. PATENT DOCUMENTS 5,190,804  3/1993  Seto et al. ............................... 428/172

FOREIGN PATENT DOCUMENTS

| | | |
|---|---|---|
| 0032597A1 | 7/1981 | European Pat. Off. . |
| 51-002736 | 1/1976 | Japan . |
| 51-002737 | 1/1976 | Japan . |
| 53-130732 | 11/1978 | Japan . |
| 61-145227 | 7/1986 | Japan . |
| 63-168470 | 7/1988 | Japan . |
| 63-268772 | 11/1988 | Japan . |
| 4-175388 | 6/1992 | Japan . |
| 5-178998 | 7/1993 | Japan . |
| 5-287206 | 11/1993 | Japan . |
| 5-302007 | 11/1993 | Japan . |
| 93/13179A | 7/1993 | WIPO . |
| 96/33243 | 10/1996 | WIPO . |
| WO9633243 | 10/1996 | WIPO . |

OTHER PUBLICATIONS

Derwent Publications Ltd., AN 96–485753.

*Primary Examiner*—Margaret W. Glass
*Attorney, Agent, or Firm*—Birch, Stewart, Kolasch & Birch, LLP

[57] ABSTRACT

The present invention provides a resinous composition for foul releasing coat adhesion containing a silica dispersed oligomer solution of an organosilane, an acrylic resin, a straight-chain polysiloxane diol, a silanol group-containing polyorganosiloxane and a curing catalyst, and an article coated therewith.

11 Claims, No Drawings

RESINOUS COMPOSITION FOR FOUL RELEASING COAT AND COATING ARTICLES

BACKGROUND OF THE INVENTION

1. Field of the Invention

The present invention relates to a resinous composition for foul releasing coat and a coated article using the same.

2. Description of the Prior Art

As a coating material for forming an endurable coating film for the purpose of protecting the surface of a substrate such as an organic substrate such as wood substrate, plastic substrate and the like; an inorganic substrate such as a glass substrate, inorganic substrate for a construction material (for example, an inorganic cured body such as a concrete, slate, cement), metal substrate (for example, a steel plate such as stainless, non-ferrous metal such as aluminum) and the like, there are known a coating composition obtained by hydrolytic polycondensation or partial hydrolytic polycondensation of a hydrolyzable organosilane or a coating composition obtained by mixing a colloidal silica with the afore-said coating composition.

For example, Japanese Patent Kokai Publication 2736/1976, 2737/1976, 130732/1978 and 168470/1988 propose a coating material comprising an organo alkoxysilane, a hydrolytic polycondensate and/or partial hydrolytic polycondensate of the organo alkoxysilane and colloidal silica, the alkoxy group being converted to silanol by excess water. The coating film obtained by this coating material has superior weatherability and is excellent for substrate protection, however, it has poor toughness due to too high hardness (pencil hardness of not less than 9H), and when the thickness of the coating film is not less than 10 $\mu$m, cracking easily will be formed if rapid change in temperature occurs in thermal-curing or use outdoors. Further, in coating process, the thickness of the coating film is often difficult to be regulated less than 10 $\mu$m strictly, and especially around coated surface or coated substance or at concave part, the thickness of the coating film is liable to be over 10 $\mu$m and inferior products are easily formed. Further, these coating materials require heat treatment at a high temperature of higher than about 100° C. or long time heat treatment to obtain desired coating property, therefore, when coating is applied to a substrate having shape which uniform heating is difficult, a substrate having large scale or a substrate inferior in heat resistance, or when heating is difficult such as coating work outdoors, the coating materials can not be used and the use thereof is restricted. Regarding a coating material having a composition obtained by removal of the colloidal silica from the above-mentioned coating material, there are problems such as lacking in film-shaping property in coating and lowered strength of the coating film.

Further, these compositions for coating have problems that the silanol obtained by hydrolysis of the alkoxysilane has high reactivity, is gradually subjected to condensation reaction even at ambient temperature, easily become gel and inferior in stability. Especially when a paint is going to be prepared by using said composition for coating as a vehicle and adding a pigment, the stability further deteriorates and it becomes impossible to prepare a paint.

Japanese Patent Kokai Publication 168/1989 proposes a coating material in which immediately before coating a catalyst and water are added as a curing agent to a partial hydrolytic polycondensate of an alkoxysilane to convert the alkoxy group to a silanol hydroxy group. However, even this coating material has poor toughness, and cracking is easily formed in a coating film having a thickness of not less than 10 $\mu$m. This coating material has excellent storability and a paint prepared from the coating material and a pigment added is relatively stable, however this coating material requires heat treatment at a high temperature of higher than about 100° C. or long time heat treatment to obtain desired coating property, therefore, when coating is applied to a substrate having shape which uniform heating is difficult, a substrate having large scale or a substrate inferior in heat resistance, or when heating is difficult such as coating work outdoors, the coating material can not be used and the use thereof is restricted.

For the purpose of solving such defects, Japanese Patent Kokai Publication 268772/1988 proposes a coating material comprising a prepolymer mainly composed of a silicon alkoxide, a curing catalyst and water and curable around ambient temperature, however toughness has not improved, and process after coating of a precoat-metal, process after coating treatment of a polycarbonate plate and the like are impossible. Further, there are defects that coating property and curing property are poor and the curing property of the coating material is apt to be influenced by humidity.

Further, Japanese Patent Kokai Publication 175388/1992 discloses a coating material comprising a partial hydrolyzed oligomer of an organosilane, a silanol group-containing polyorganosiloxane and a curing catalyst. This coating material has advantages that the coating property and curing property are improved, curing at room temperature is possible, and it is not influenced by humidity, however the toughness of the coating material is not sufficiently improved.

Taken together, the above facts demonstrate that a coating material comprising as a main component an organoalkoxysilane or a hydrolyzate of an organoalkoxysilane provides a coating film which has high hardness, is difficult to be scratched and has excellent weatherability. However, this coating film is poor in stiffness and therefore cracking is apt to be formed in coating process or in use, and this phenomenon is remarkable when the thickness of the film is not less than 10 $\mu$m. Further, this coating material requires baking at a high temperature of not lower than 100° C., and though coating in a factory is possible, coating outdoors and at construction site is difficult. And it is demerit that the coating liquid has high reactivity and poor in storability.

Further, since the above-mentioned coating material is an inorganic coating material, the coating film thereof is liable to be inferior in adhesion to an organic substrate and an organic coating substrate.

There is also reported a resin carrying a hydrolyzable silane functional group and having as a main chain an organic resin such as acryl, polyester, epoxy, polyether, vinyl and the like (see Japanese Patent Kokai Publication 287206/1993, 302007/1993 and the like). However, these resins are inferior in weatherability and hardness of the coating film as compared with an inorganic resin containing as a main component an organoalkoxysilane, since the main chain thereof is composed of an organic resin. Further, also, Japanese Patent Kokai Publication 72928/1993 and 178998/1993 propose a reactive resin having a polymerizable acrylic functional group as a terminal or side chain and having a linear polysiloxane as a main chain. However, since the main chain is composed of a linear polysiloxane, excellent hardness of the resulting coating film is not obtained, and in some cases, this polysiloxane resin is a rubber elastomer and is not suitable as a resin for coating.

The above-mentioned inorganic cured body such as a concrete, slate, cement and the like is a material excellent in heat resistance and endurance, however the inorganic cured body has disadvantages that if the surface thereof is not coated, the surface is impregnated with water, is easy to be fouled and is inferior in acid resistance. Further, the appearance of the non-coated body is not anesthetic.

To supplement these defects, the surface of the inorganic substrate has been coated with an organic paint. However, the coating film formed by an organic paint has disadvantages that 1) it is poor in weatherability, 2) it is easily scratched due to low hardness, 3) it is inferior in adhesion to an inorganic substrate, and the like.

Then, there has been tried the application of an inorganic coating material such as water glasses and the like in place of the organic material, however, a satisfactory coating material has not been obtained in that efluorescence generates and it is porous.

SUMMARY OF THE INVENTION

The present invention relates to a resinous composition for foul releasing coat comprising the following components (A), (B), (C), (D) and (E):

component (A):
a silica-dispersed oligomer solution of an organosilane obtained by partial hydrolysis of a hydrolyzable organosilane represented by formula (I):

$$R^1_m SiX_{4-m} \tag{I}$$

wherein, $R^1$ is the same or a different substituted or unsubstituted monovalent hydrocarbon group having 1 to 8 carbon atoms, m is an integer from 0 to 3, and X is a hydrolyzable group,
in a colloidal silica dispersed in an organic solvent, water or mixture solvent thereof in the presence of water, component (B):
an acrylic resin which is a copolymer of
the first, the second and the third (meth)acrylate represented by formula (II):

$$CH_2=CR^2(COOR^3) \tag{II}$$

wherein in the first (meth)acrylate; $R^2$ is a hydrogen atom and/or methyl group, and $R^3$ is a substituted or unsubstituted monovalent hydrocarbon group having 1 to 9 carbon atoms;
in the second (meth)acrylate, $R^2$ is as defined above, and $R^3$ is at least one group selected from the group consisting of an epoxy group, glycidyl group and a hydrocarbon group containing at least one of an epoxy group and glycidyl group; and
in the third (meth)acrylate, $R^2$ is as defined above, and $R^3$ is a hydrocarbon group containing an alkoxy silyl group and/or silyl halide group;

component (C):
a linear polysiloxane diol represented by formula (III):

$$HO(R^4_2SiO)_nH \tag{III}$$

wherein $R^4$ is the same or different monovalent hydrocarbon group and n is an integer of not less than 3, component (D):
a polyorganosiloxane containing a silanol group in the molecule represented by formula (IV):

$$R^5_a Si(OH)_b O_{(4-a-b)/2} \tag{IV}$$

wherein $R^5$ is the same or different substituted or unsubstituted monovalent hydrocarbon group having 1 to 8 carbon atoms, and a and b are a number which respectively suffices $0.2 \leq a < 2$, $0.0001 \leq b \leq 3$ and $a+b<4$, and component (E):
a curing catalyst.

According to the present invention a resinous composition for foul releasing coat is provided, which can be cured by thermal acceleration at a low temperature of lower than 100° C. and cured at ambient temperature, excellent in adhesion to various substrates whether they are organic or inorganic, excellent in weatherability, can form a coating film which no cracking is formed at a thickness of thicker than 10 µm due to excellent toughness (flexibility), can form a cured coating film having hardness which is neither too high nor too low, can be optionally colored by adding a pigment since it can be used as a vehicle when processed to be a paint by adding a pigment and especially excellent in foul releasing effect on the surface of a substrate, and a coated article using the above-mentioned resinous composition.

DETAILED DESCRIPTION OF THE INVENTION

The present invention relates to a resinous composition for foul releasing coat comprising the following components (A), (B), (C), (D) and (E):

component (A):
a silica-dispersed oligomer solution of an organosilane obtained by partial hydrolysis of a hydrolyzable organosilane represented by formula (I):

$$R^1_m SiX_{4-m} \tag{I}$$

wherein $R^1$ is the same or different substituted or unsubstituted monovalent hydrocarbon group having 1 to 8 carbon atoms, m is an integer from 0 to 3, and X is a hydrolyzable group,
in a colloidal silica dispersion in an organic solvent, water or mixture thereof in the presence of water.

component (B):
an acrylic resin which is a copolymer of the first, the second and the third (meth)acrylate represented by formula (II):

$$CH_2=CR^2(COOR^3) \tag{II}$$

wherein in the first (meth)acrylate $R^2$ is a hydrogen atom and/or methyl group, and $R^3$ is a substituted or unsubstituted monovalent hydrocarbon group having 1 to 9 carbon atoms;
in the second (meth)acrylate $R^2$ is as defined above, and $R^3$ is at least one group selected from the group consisting of an epoxy group, glycidyl group and a hydrocarbon group containing at least one of an epoxy group and glycidyl group; and
in the third (meth)acrylate $R^2$ is as defined above, and $R^3$ is a hydrocarbon group containing an alkoxy silyl group and/or silyl halide group;

component (C):
a linear polysiloxane diol represented by formula (III):

$$HO(R^4_2SiO)_nH \tag{III}$$

wherein $R^4$ is the same or different monovalent hydrocarbon group, and n is an integer of 3 or more, component (D):
a polyorganosiloxane containing a silanol group in the molecule represented by formula (IV):

$$R^5{}_a Si(OH)_b O_{(4-a-b)/2} \quad (IV)$$

wherein $R^5$ is the same or different, substituted or unsubstituted monovalent hydrocarbon group having 1 to 8 carbon atoms, and a and b are a number which respectively suffices $0.2 \leq a < 2$, $0.0001 \leq b \leq 3$ and $a+b < 4$;

component (E):
    a curing catalyst.

In this text, the (meth)acrylate represents either an acrylate or a methacrylate or both of them.

The above-mentioned component (B) preferably has a weight-average molecular weight from 1000 to 50000 in terms of a polystyrene.

The amount to be blended of the above-mentioned component (B) in the resinous composition for a foul releasing coat of the present invention is preferably from 0.1 to 100 parts by weight based on 100 parts by weight of the total amount of said components (A) and (D) in solid.

The integer n in the above-mentioned formula (III) representing the afore-said component (C) is preferably in the range of $10 \leq n \leq 100$.

The amount to be blended of the above-mentioned component (C) in the resinous composition for foul releasing coat of the present invention is preferably from 0.1 to 100 parts by weight based on 100 parts by weight of the total amount of said components (A) and (D) in solid.

The coated article of the present invention comprises a cured coating film of the resinous composition for a foul releasing coat of the present invention on the surface of a substrate.

The above-mentioned substrate is selected from the group consisting of an inorganic substrate, an organic substrate and an organic coated substrate having an organic coating film on the surface of an inorganic substrate or an organic substrate.

The silica-dispersed oligomer solution (A) used as the component (A) of the resinous composition for foul releasing coat is a main component of a base polymer having a hydrolyzable group (X) which is a functional group participating curing reaction in formation of a cured coating film. This is obtained, for example, by adding one or more kinds of the hydrolyzable organosilane represented by the above-mentioned formula (I) to a colloidal silica dispersed in an organic solvent or water (including also a mixed solvent of an organic solvent and water), and by partially hydrolyzing the above-mentioned hydrolyzable organosilane with water (water contained in the colloidal silica and/or water added separately).

The $R^1$ group in the hydrolyzable organosilane represented by the formula (I) is not particularly restricted if it is the same or different, substituted or unsubstituted monovalent hydrocarbon group having 1 to 8 carbon atoms, preferably 1 to 5, and the example thereof may includes an alkyl group such as a methyl group, ethyl group, propyl group, butyl group, pentyl group, hexyl group, heptyl group, octyl group and the like; a cycloalkyl group such as a cyclopentyl group, cyclohexyl group and the like; an aralkyl group such as a 2-phenylethyl group, 2-phenypropyl group, 3-phenypropyl group and the like; an aryl group such as a phenyl group, tolyl group and the like; an alkenyl group such as a vinyl group, allyl group and the like; a halogen-substituted hydrocarbon group such as a chloromethyl group, γ-chloropropyl group, 3,3,3-trifluoropropyl group and the like; a substituted hydrocarbon group such as a γ-methacryloxypropyl group, γ-glycidoxypropyl group, 3,4-epoxycyclohexylethyl group, γ-mercaptopropyl group and the like, and the like. Among them, an alkyl group having 1 to 4 carbon atoms and phenyl group are preferable since they are easy to be synthesized and are easily available.

In the above-mentioned formula (I), the hydrolyzable group X is not particularly restricted, and the example thereof includes an alkoxy group, acetoxy group, oxime group, enoxy group, amino group, aminoxy group, amide group and the like. Among them, an alkoxy group is preferable since it is easily available and the silica-dispersed oligomer solution (A) of an organosilane is easy to be prepared.

The example of the above-mentioned hydrolyzable organosilane includes a mono, di, tri or tetra functional (m in the formula (I) is an integer from 3 to 0 respectively) alkoxysilanes, acetoxysilanes, oximesilanes, enoxysilanes, aminosilanes, aminoxysilanes, amidesilanes and the like. Among them, alkoxysilanes are preferable since they are easily available and the silica-dispersed oligomer solution (A) of an organosilane is easy to be prepared.

Among the alkoxysilanes, particularly, as a tetraalkoxysilane in which m is 0, there can be exemplified tetramethoxysilane, tetraethoxysilane and the like, and as an organotrialkoxysilane in which m is 1, there can be exemplified methyltrimethoxysilane, methyltriethoxysilane, methyltriisopropoxysilane, phenyltrimethoxysilane, phenyltriethoxysilane, 3,3,3-trifluoropropyltrimethoxysilane and the like. And, as a diorganodialkoxysilane in which m is 2, there can be exemplified dimethyldimethoxysilane, dimethyldiethoxysilane, dipheyldimethoxysilane, dipheyldiethoxysilane, methylphenyldimethoxysilane and the like, and as a triorganodialkoxysilane in which m is 3, there can be exemplified trimethylmethoxysilane, trimethylethoxysilane, trimethylisopropoxysilane, dimethylisobutylmethoxysilane and the like. Further, an organosilane compound generally called as a silane coupling agent is included in the alkoxysilanes.

Among the hydrolyzable organosilanes represented by the formula (I), not less than 50% by mol, preferably not less than 60% by mol, more preferably not less than 70% by mol are a trifunctional one in which m is 1. When the amount of the trifunctional one is less than 50% by mol, sufficient hardness of the coating film is not obtained and dry curing property is liable to lower.

The colloidal silica in the component (A) has effect to increase the hardness of the cured coating film composed of the resinous composition for foul releasing coat and to improve the smoothness and cracking resistance. As the colloidal silica, for example, there can be used a colloidal silica dispersible in water or non aqueous organic solvent such as an alcohol and the like, though it is not particularly restricted. In general, such colloidal silica contains 20 to 50% by weight of silica as a solid component, and the amount to be blended of silica can be determined from this value. When a water dispersible colloidal silica is used, water existing as a component other than the solid component can be used for hydrolysis of the above-mentioned hydrolyzable organosilane and can be used as a curing agent for the resinous composition for foul releasing coat. The water dispersible colloidal silica is usually prepared from a water glass, and easily available as a commercial product. Further, the organic solvent dispersible colloidal silica can be easily prepared by substituting an organic solvent for water in the above-mentioned water dispersible colloidal silica. Such organic solvent dispersible colloidal silica also can be easily available as a commercial product similarly to the water dispersible colloidal silica. In the organic solvent dispersible colloidal silica, the kind of the organic solvent in which the colloidal silica is dispersed is not particularly restricted, and the example thereof includes a lower aliphatic alcohols such as methanol, ethanol, isopropanol, n-butanol, isobutanol and the like; ethylene glycol derivatives such as ethylene glycol, ethylene glycol monobutyl ether, ethylene glycol acetate monoethyl ether and the like; diethylene glycol derivatives such as diethylene glycol, diethylene glycol monobutyl ether and the like; and diacetone alcohol, and the like, and one or more than one selected from the group consisting of them can be used. In combination with these hydrophilic organic solvents, there can also be used toluene, xylene, ethyl acetate, butyl acetate, methyl ethyl ketone, methyl isobutyl ketone, methyl ethyl ketoxime and the like.

In the component (A), the colloidal silica is contained in the amount preferably from 5 to 95 parts by weight, more preferably from 10 to 90 parts by weight, further preferably from 20 to 85 parts by weight, as a silica based on 100 parts by weight in terms of silica calculated from the amount of hydrolyzable organosilane for formula (I). The amount contained is less than 5 parts by weight, desired hardness of the coating film is liable to be not obtained. On the other hand, when over 95 parts by weight, there may be caused disadvantages that uniform dispersion of silica becomes difficult and the component (A) gels, hardening is disturbed and the like.

The amount of water which is made existing in preparing the silica-dispersed oligomer solution (A) of an organo silane is not particularly restricted, and is for example in the range preferably from 0.001 to 0.5 mol, more preferably from 0.01 to 0.4 mol based on 1 mol equivalent of the hydrolyzable group (X) carried by the above-mentioned hydrolyzable organo silane. When the amount of water is less than 0.001 mol, there is a tendency that sufficient partial hydrolyzate is not obtained, and when over 0.5 mol, the partial hydrolyzate tends to become unstable. The method for partial hydrolysis is not particularly restricted, and, for example, a hydrolyzable organo silane and a colloidal silica may be mixed (when water is not contained at all or necessary amount of water is not contained in the colloidal silica, here water may be added and blended.). In this stage, though partial hydrolysis reaction progresses at ambient temperature, for acceleration of the partial hydrolysis reaction, the mixture optionally may be heated (for example, at 60 to 100° C.), or a catalyst may be used. This catalyst is not particularly restricted, and there can be used, for example, one or more of organic acids or inorganic acid such as hydrochloric acid, acetic acid, silane halide, chloro acetic acid, citric acid, benzoic acid, dimethyl malonic acid, formic acid, propionic acid, glutaric acid, glycolic acid, maleic acid, malonic acid, toluene sulfonic acid, oxalic acid and the like.

The pH value of the liquid component should be preferably from 2.0 to 7.0, more preferably from 2.5 to 6.5, further preferably from 3.0 to 6.0, to obtain the ability of the component (A) stably for a long time. When pH value is out of such range, especially under the condition that the amount to be used of water is not less than 0.3 mol per 1 mol of the hydrolyzable group (X), durability of the ability of the component (A) is remarkably liable to lower. When the pH value of the component (A) is out of the above-mentioned range, if it is acidic side of this range, pH value may be regulated by addition of a basic reagent such as ammonia, ethylenediamine and the like, if it is basic side of this range, pH may be regulated by addition of a acidic reagent such as hydrochloric acid, nitric acid, acetic acid and the like. However, the regulation method is not particularly restricted.

The acrylic resin (B) used as the component (B) contained in the resinous composition for foul releasing coat has effect to improve the toughness of the cured coating film composed of the resinous composition for foul releasing coat, and by this effect prevents the occurrence of cracking to make thickening possible. The acrylic resin (B) is taken in the condensation crosslinked material of the component (A) and component (D) which composes the three dimensional skeleton of the cured coating film composed of the resinous composition for foul releasing coat, and the acrylic resin (B) modifies the condensation crosslinked material. When the condensation crosslinked material is modified with the acrylic resin, adhesion of the cured coating film composed of the resinous composition for foul releasing coat to a substrate is improved.

The first (meth)acrylate which is one constituent monomer of the acrylic resin (B) is at least one of the (meth) acrylates represented by the formula (II) in which $R^3$ is a substituted or unsubstituted monovalent hydrocarbon having 1 to 9 carbon atoms, more preferably 1 to 5 carbon atoms, for example, an alkyl group such as a methyl group, ethyl group, n-propyl group, i-propyl group, n-butyl group, i-butyl group, sec-butyl group, tert-butyl group, pentyl group, hexyl group, heptyl group, octyl group and the like; a cycloalkyl group such as a cyclopentyl group, cyclohexyl group and the like; an aralkyl group such as a 2-phenylethyl group, 2-phenylpropyl group, 3-phenylpropyl group and the like; an aryl group such as a phenyl group, tolyl group and the like; a hydrocarbon halide group such as a chloromethyl group, γ-chloropropyl group, 3,3,3-trifluoropropyl group and the like; a hydroxyhydrocarbon group such as a 2-hydroxyethyl group and the like, and the like.

The second (meth)acrylate which is another constituent monomer of the acrylic resin (B) is at least one of the (meth)acrylates represented by the above-mentioned formula (II) in which $R^3$ is at least hydrocarbon group selected from the group consisting of a epoxy group, glycidyl group and hydrocarbon group containing at least one of them (for example, γ-glycidoxypropyl group and the like).

The third (meth)acrylate which is still another constituent monomer of the acrylic resin (B) is at least one of the (meth)acrylates represented by the above-mentioned formula (II) in which $R^3$ is a hydrocarbon group containing an alkoxysilyl group and/or silyl halide group, for example, a trimethoxysilylpropyl group, dimethoxymethylsilylpropyl group, monomethoxydimethylsilylpropyl group, triethoxysilylpropyl group, diethoxymethylsilylpropyl group, ethoxydimethylsilylpropyl group, trichlorosilylpropyl group, dichloromethylsilylpropyl group, chlorodimethylsilylpropyl group, chlorodimethoxysilylpropyl group, dichloromethoxysilylpropyl group and the like.

The acrylic resin (B) is a copolymer of (meth)acrylates comprising at least each one of the above-mentioned first, second and third (meth)acrylates respectively, namely at least three esters in total, and may be a copolymer containing additionally one or more selected from the above-mentioned first, second and third (meth)acrylates or one or more selected from (meth)acrylates other than the above-mentioned (meth)acrylates.

The above-mentioned first (meth)acrylate is an essential component to improve toughness of the cured coating film of the resinous composition for foul releasing coat, and further has effect to improve compatibility between the component (A) and the component (D). Therefore, it is desirable that the substituted or unsubstituted hydrocarbon group $R^3$ has volume not less than certain level and contains not less than two carbon atoms.

The second (meth)acrylate is an essential component to improve adhesion of the cured coating film of the resinous composition for foul releasing coat to a substrate.

The third (meth)acrylate forms chemical bonds between the acrylic resin (B) and the component (A) and the component (D) in curing of the coating film of the resinous composition for foul releasing coat, and thus the acrylic resin (B) is fixed in the cured coating film. Also, the third (meth)acrylate has effect to improve compatibility between the acrylic resin (B) and the component (A) and the component (D).

The molecular weight of the acrylic resin (B) is strongly concerned with the compatibility between the acrylic resin (B) and the component (A) and the component (D). Therefore, the acrylic resin (B) has a weight-average molecular weight in terms of a polystyrene preferably from 1000 to 50000, more preferably from 1000 to 20000. When the weight-average molecular weight in terms of a polystyrene of the acrylic resin (B) is over 50000, there may occur phase separation and whitening of the coating film. When the above-mentioned molecular weight it less than 1000, there is a tendency that toughness of the coating film lowers and cracking occurs.

It is desirable that the amount of the second (meth)acrylate is not less than 2%, more preferably about 5% in terms of the mol ratio of a monomer in a copolymer. When the amount is less than 2%, adhesion of the coating film is liable to be insufficient.

It is desirable that the amount of the third (meth)acrylate is in the range of 2 to 50% more preferably 5 to 30% in terms of the mol ratio of a monomer in a copolymer. When the amount is less than 2%, compatibility between the acrylic resin (B) and the component (A) and the component (D) is inferior, and the coating film may whiten. On the other hand, when over 50%, bond density between the acrylic resin (B) and the component (A) and the component (D) becomes too high, and there is a tendency that improvement of toughness is not observed which is the original object of the acrylic resin.

As the synthesis method of the acrylic resin (B), there can be used a known one, for example, a radical polymerization, an anion polymerization or a cation polymerization by a suspension polymerization, an emulsion polymerization or a solution polymerization in an organic solvent, however, the method is not limited to them.

In the radical polymerization method by a solution polymerization, for example, the above-mentioned first, second and third (meth)acrylate monomer are dissolved in an organic solvent in a reaction vessel, a radical polymerization initiator is further added, and the polymerization is conducted by heating under nitrogen flow according to a known method. The organic solvent used here is not particularly restricted, and there may be used, for example, toluene, xylene, ethyl acetate, butyl acetate, methyl ethyl ketone, methyl isobutyl ketone, ethylene glycol monobutyl ether, diethylene glycol monobutyl ether, ethylene glycol acetate monoethyl ether and the like. The radical polymerization initiator is not particularly restricted, and there may be used, for example, cumene hydroperoxide, tertiary butyl hydroperoxide, dicumyl peroxide, di tertiary butyl peroxide, benzoyl peroxide, acetyl peroxide, lauroyl peroxide, azobisisobutyronitrile, hydrogen peroxide-$Fe^{2+}$ salt, persulfate-$NaHSO_3$, cumene hydroperoxide-$Fe^{2+}$ salt, benzoyl peroxide-dimethylaniline, peroxide-triethylaluminium and the like. For regulation of the molecular weight, a chain transfer agent can also be added. The chain transfer agent is not particularly restricted, and there may be used, for example, quinones such as monoethylhydroquinone, p-benzoquinone and the like; thiols such as mercaptoacetic acid-ethyl ester, mercaptoacetic acid-n-butyl ester, mercaptoacetic acid-2-ethylhexyl ester, mercaptocyclohexane, mercaptocyclopentane, 2-mercapto ethanol and the like; thiophenols such as di-3-chlorobenzene thiol, p-toluene thiol, benzene thiol and the like; thiol derivatives such γ-mercaptopropyltrimethoxysilane and the like; phenylpicrylhydrazine; diphenylamine; tertiary butyl catechol and the like.

In the resinous composition for foul releasing coat, the amount to be blended of the acrylic resin (B) is not particularly restricted, and is, for example, preferably from 0.1 to 100 parts by weight, more preferably from 1 to 90 parts by weight, further preferably from 5 to 80 parts by weight based on 100 parts by weight of the total solid component amount of said components (A) and (D). When the amount is less than 0.1 part by weight, there is a tendency that toughness becomes weaken. When over 100 parts by weight, cure inhibition of the coating film is liable to be caused.

The linear polysiloxane diol (C) which is used as the component (C) of the resinous composition for foul releasing coat is a component which has effect that 1) it improves cracking resistance of the coating film by imparting toughness to the cured coating film of the composition, 2) it imparts water repelling property to the surface of the cured coating film of the composition such that the surface of the coating film is difficult to be fouled with stain and even if the surface is fouled with stain, the stain is easily removed (release foul from the surface of the coating film), and the like.

In the above-mentioned formula (III) representing the linear polysiloxane diol (C), $R^4$ is not particularly restricted if it is a monovalent hydrocarbon group, and, for example, the same group can be used as described above for $R^1$ in the above-mentioned formula (I). Among linear polysiloxane diols having such $R^4$ group, dimethylsiloxane diol and methylphenylsiloxane diol are preferred for imparting excellent water repelling property to the cured coating film composed of the resinous composition for foul releasing coat.

The linear polysiloxane diol (C) is a molecule relatively poor in reactivity, since it does not have a reaction group other than a terminal OH group. As a result, the linear polysiloxane diol (C) blended in the resinous composition for foul releasing coat is lacking in complete compatibility in the composition and dispersed as a ultrafine particle, therefore, it is easily oriented on the surface of the coating film to form a monomolecular layer, and finally, a silanol group which is a terminal reactive group is subjected to a condensation reaction with a bulk resin and is fixed on the surface of the coating film. As a result, the siloxane bond is localized in high density on the surface of the cured coating film, and the cured coating film of the resinous composition for foul releasing coat can be endowed with excellent water repelling property for long period. Since the linear polysiloxane diol in which n in the above-mentioned formula (III) is relatively small is excellent in compatibility, it not only forms a layer on the surface of the coating film but also is taken in the bulk to impart elasticity and toughness to the cured coating film, also leading to cracking inhibition effect.

The integer in the above-mentioned (III) is preferably in the range of $10 \leq n \leq 100$, more preferably in the range of $10 \leq n \leq 50$, and further preferably in the range of $20 \leq n \leq 40$. When n is less than 10, effect to improve water repelling property is inclined to lower. When n is over 100, there is a tendency that relative bonding strength between the linear polysiloxane diol (C) and the bulk coating film lower, no fixing is maintained on the surface of the cured coating film for a long period, and water repelling property is lost with time.

The amount of the linear polysiloxane diol (C) in the resinous composition for foul releasing coat is not particularly restricted, and it is, for example, preferably from 0.1 to 100 parts by weight, more preferably from 1 to 90 parts by weight, further preferably from 2 to 80 parts by weight based on 100 parts by weight of the total solid amount of said components (A) and (D). When the amount is less than 0.1 part by weight, there is a tendency that water repelling property is weaken. When over 100 parts by weight, cure inhibition of the coating film is liable to be caused.

The silanol group-containing polyorganosiloxane (D) used as the component (D) of the resinous composition for foul releasing coat is a crosslinking agent which conducts condensation reaction with the component (A) which is a base polymer having a hydrolyzable group as a functional group which participates curing reaction, to form three dimensional crosslink in the cured coating film, and is a component to absorb strain due to curing shrinkage of the component (A) for preventing occurrence of cracking.

The group $R^5$ in the above-mentioned formula (IV) representing the silanol group-containing polyorganosiloxane (D) is not particularly restricted and the same group as $R^1$ in the above-mentioned formula (I) is exemplified, and it is preferably an alkyl group having 1 to 4 carbon atoms, phenyl group, vinyl group, substituted hydrocarbon group such as γ-glycidoxypropyl group, γ-methacryloxypropyl group, γ-aminopropyl group, 3,3,3-trifluoropropyl group and the like, more preferably methyl group and phenyl group. Further, in the above-mentioned formula (IV), a and b are respectively a number which suffices the above-mentioned relation, and when a is less than 0.2 or b is over 3, there are disadvantages that cracking occurs on the cured coating film and the like. And, when a is not less than 2 and not more than 4, or b is less than 0.0001, curing does not progress successfully.

The silanol group-containing polyorganosiloxane (D) is not particularly restricted, and it can be obtained, for example, by hydrolysis of one or more of methyltrichlorosilane, dimethyldichlorosilane, phenyltrichlorosilane, diphenyldichlorosilane or corresponding alkoxysilanes, with a plenty of water in a known method. When hydrolysis is conducted using an alkoxysilane in a known method for obtaining the silanol group-containing polyorganosiloxane (D), an alkoxy group which is not hydrolyzed may remain in a small amount. Namely, in some case, there is obtained a polyorganosiloxane in which a silanol group and extremely small amount of alkoxy group coexist, and, in the present invention, such a polyorganosiloxane may be used without problem.

The ratio of the component (A) to the component (D) in the resinous composition for foul releasing coat is not particularly restricted, and it is, for example, preferably 1 to 99 parts by weight of the component (A) to 99 to 1 part by weight of the component (D), more preferably 5 to 95 parts by weight of the component (A) to 95 to 5 parts by weight of the component (D), and more preferably 10 to 90 parts by weight of the component (A) to 90 to 10 parts by weight of the component (D) in solid (the total amount of the components (A) and (D) is 100 parts by weight in solid). When the amount of the component (A) is less than 1 part by weight, there is a tendency that the curing property is inferior and sufficient hardness of the coating film is not obtained. On the other hand, when the amount of the component (A) is over 99 parts by weight, curing property is unstable and excellent coating film may not be obtained.

The curing catalyst (E) used as the component (E) of the resinous composition for foul releasing coat is a component which accelerates condensation reaction of the component (A) and the component (D) and cures the coating film. The example of the curing catalyst (E) is not particularly restricted, and includes, for example, alkyltitanates; metal carboxylates such as tin octylate, dibutyl tin dilaurate, dioctyl tin dimaleate and the like; amine salts such as dibutylamine-2-hexoate, dimethylamine acetate, ethanolamine acetate and the like; a quaternary ammonium carboxylate such as tetramethylammonium acetate and the like; amines such as tetraethylpentamine and the like; amine based silane coupling agent such as N-β-aminoethyl-γ-aminopropyltrimethoxysilane, N-β-aminoethyl-γ-aminopropylmethyldimethoxysilane and the like; acids such as p-toluene sulfonic acid, phthalic acid, hydrochloric acid and the like; an aluminum compound such as aluminum alkoxide, aluminum chelate and the like; an alkaline metal salt such as lithium acetate, lithium formate, sodium formate, potassium phosphate, potassium hydroxide and the like; a titanium compound such as tetraisopropyl titanate, tetrabutyl titanate, titaniumtetraacetyl acetonate and the like; silane halides such as methyltrichlorosilane, dimethyldichlorosilane, trimethylmonochlorosilane and the like. However, the other compound than these compounds is not excluded if it is effective in accelerating condensation reaction of the component (A) and the component (B).

The amount to be blended of the curing catalyst (E) in the resinous composition for foul releasing coat is not particularly restricted, and it is, for example, preferably in the range of 0.0001 to 10 parts by weight, more preferably in the range of 0.0005 to 8 parts by weight and further preferably in the range of 0.0007 to 5 parts by weight based on 100 parts by weight of the total amount of said components (A) and (D) in solid. When the amount of the component (E) is less than 0.0001 part by weight, there is a tendency that the curing property lowers and sufficient hardness of the coating film is not obtained. On the other hand, when the amount of the component (E) is over 10 parts by weight, there are fears that heat resistance of the cured coating film lowers and cracking is caused due to too high hardness of the cured coating film.

A preferable formulation of the resinous composition for foul releasing coat is:

Component (A) 20% to 35% more preferably 25% to 30%
Component (B) 35% to 55% more preferably 40% to 50%
Component (C) 5% to 25% more preferably 10% to 20%
Component (D) 5% to 25% more preferably 10% to 20%
Component (E) 0.5% to 3% more preferably 1% to 2%
(In the above formulation the amount is expressed by percent by weight in solid)

The amount of these components should be understood as approximate standards, which varies depended on the ratio of the colloidal silica and the hydrolyzable organosilane of formula (I) in the Component (A), the molar ratio of the hydrolyzable organosilane of formula (I) and the polyorganosiloxane of the Component (D) and the number of functional group and molecular weight and so on.

The amount of collidal silica in the resinous composition of the present invention is preferably 1 to 40% by weight, more preferably 5 to 30% by weight based on the total amount of solid in the resinous composition. If the amount of the colloidal silica is more than 40% by weight, there may be caused disadvantages that uniform dispersion of silica becomes difficult and component (A) gels, hardening is disturbed and the like. If it is less than 1% by weight, desired hardness of the coating film is liable to be not obtained.

The resinous composition for foul releasing coat may optionally contain a pigment. The pigment which can be used is not particularly restricted, and an appropriate pigment includes, for example, an organic pigment such as carbon black, quinacridone, naphthol red, cyanin blue, cyanin green, Hansa yellow and the like; an inorganic pigment such as titanium oxide, barium sulfate, red oxide, complex metal oxide and the like, and one or more compounds selected from the group consisting of them may be combined and used without problems. The dispersion method of the pigment is not particularly restricted, and may include usual methods, for example, a method in which a pigment and the like. Then, a dispersant, dispersion aid, thickening agent, coupling agent and the like can be used. The amount to be added of the pigment is not particularly restricted since the hiding property differs depending on the kind of the pigment, and it is, for example, preferably from 5 to 100 parts by weight, more preferably from 5 to 80 parts by weight based on 100 parts by weight of the total amount of the components (A), (B), (C) and (D). When the amount to be added of the pigment is less than 5 parts by weight, hiding property is apt to be worse, and when the amount to be added of the pigment is over 100 parts by weight, smoothness of the coating film may be worse.

Further, a leveling agent, dye, metal powder, glass powder, anti-fungus agent, antioxidant, antistatic agent, ultraviolet absorber and the like may be contained in the resinous composition for foul releasing coat in an amount which does not impart bad influence on the effect of the present invention.

The resinous composition for foul releasing coat can optionally be diluted by various organic solvents and used for easiness of handling or may be one which has been diluted by the said organic solvent. The kind of the organic solvent can be selected depending on the kind of the monovalent hydrocarbon group contained in the components (A), (B), (C) and (D), or one the molecular weight of the components (A), (B), (C) and (D). Such an organic solvent is not particularly restricted, and may include, for example, lower aliphatic alcohols such as methanol, ethanol, isopropanol, n-butanol, isobutanol and the like; an ethylene glycol derivative such as ethylene glycol, ethylene glycol monobutyl ether, ethylene glycol acetate monoethyl ether and the like; a diethylene glycol derivative such as diethylene glycol, diethylene glycol monobutyl ether and the like; and, toluene, xylene, hexane, heptane, ethyl acetate, butyl acetate, methyl ethyl ketone, methyl isobutyl ketone, methyl ethyl ketoxime, diacetone alcohol and the like, and one or more than one selected from the group consisting of them can be used. The ratio to be diluted of the organic solvent is not particularly restricted, and optionally it may be suitably determined.

The method for coating the resinous composition for foul releasing coat on a substrate is not particularly restricted, and there can be selected usual various coating methods such as printing brush coating, spray, dipping, flow, roll, curtain, knife coat and the like.

The method for curing the resinous composition for foul releasing coat coated on a substrate is not particularly restricted, and known method may be used. Further, the temperature in curing is not particularly restricted, and it can be within a wide temperature range from ambient temperature to heated temperature depending on desired property of the cured coating film.

The thickness of the cured coating film formed from the resinous composition for foul releasing coat is not particularly restricted and may be from around 0.1 to 100 $\mu$m, and preferably from 1 to 50 $\mu$m especially for the cured coating film to stably adheres to and be supported by the substrate and for crack and peeling to be inhibited.

The substrate on which the resinous composition for foul releasing coat of the present invention is coated and which is used for the coated article of the present invention is not particularly restricted, and includes an inorganic substrate, an organic substrate and an organic coated substrate with an organic coating film on either of these substrates.

The inorganic substrate is not particularly restricted, and includes, for example, a metal substrate; a glass substrate; an enamel inorganic construction such as water glass decorative laminate and the like; ceramics, and the like.

The metal substrate is not particularly restricted, and includes, for example, a non-ferrous metal [for example, aluminum (JIS-H4000 and the like), aluminum alloy (duralumin and the like), copper, zinc, and the like], iron, steel [for example, rolled shape (JIS-G3101 and the like), molten galvanized sheet (JIS-G3302 and the like), (rolled) stainless steel (JIS-G4304, JIS-G4305 and the like), and the like], tinplate (JIS-G3303 and the like), and the other metals on the whole (including alloy).

The glass substrate is not particularly restricted, and includes, for example, a soda glass, a pyrex glass, a silica glass and the like.

The above-mentioned enamel is a layer which is formed by baking a glassy enamel reagent on the surface of a metal. The base metal is not particularly restricted, and includes, for example, a mild steel sheet, steel sheet, cast iron, aluminum and the like. The enamel reagent is usual one and is not particularly restricted.

The water glass decorative laminate indicates, for example, a decorative laminate produced by coating sodium silicate on a cement substrate such as a slate and baking.

The inorganic cured body is not particularly restricted, and includes, for example, substrates on the whole obtained by curing and molding an inorganic material such as a fiber-reinforced cement plate (JIS-A5430 and the like), ceramic industry type sizing (JIS-A5422 and the like), cemented excelsior board (JIS-A5404 and the like), pulp cement plate (JIS-A5414 and the like), slate-cemented excelsior laminate (JIS-A5426 and the like), gypsum board product (JIS-A6901 and the like), clay roof tile (JIS-A5208 and the like), pressed cement roof tile (JIS-A5402 and the like), earthenware tile (JIS-A5209 and the like), concrete block for construction (JIS-A5406 and the like), terrazzo (JIS-A5411 and the like), prestressed concrete double T slab (JIS-A5412 and the like), ALC panel (JIS-A5416 and the like), hollow prestressed concrete panel (JIS-A6511 and the like), normal roof tile (JIS-R1250 and the like), and the like.

The conventional silicone coating is easily eroded by an alkali dissolved from a water glass decorative laminate and inorganic cured body, and long term endurance is not obtained, therefore, previous seal treatment on a substrate is necessary. When, the resinous composition for foul releasing coat is used, there is a merit that long term endurance is obtained since the composition is difficult to be eroded by the alkali due to introduction of the above-mentioned acrylic resin (B).

The ceramic substrate is not particularly restricted, and includes, for example, alumina, zirconia, silicon carbide, silicon nitride and the like.

The organic substrate is not particularly restricted, and includes, for example, plastic, wood, paper and the like.

The plastic substrate is not particularly restricted, and includes, for example, thermosetting plastics or thermoplastics such as a polycarbonate resin, acrylic resin, ABS resin, vinyl chloride resin, epoxy resin, phenol resin (polyethylene-terephthalate resin, polybutylene-terephthalate resin) and the like and fiber-reinforced plastics (FRP) obtained by reinforcing these plastics with a fiber such as a glass fiber, nylon fiber, carbon fiber and the like. The resinous composition for foul releasing coat of the present invention can be coated also on a relatively soft substrate such as a plastic, and there are obtained effects that scratching on the surface is prevented and foul can be easily released, since toughness of the resulting cured coating film is improved.

The organic coating film constituting the organic coated substrate is not particularly restricted, and includes, for example, a cured coating film composed of a coating material containing an organic resin such as an acryl based, alkyd based, polyester based, epoxy based, urethane based, acryl silicon based, chlorinated rubber based, phenol based, melamine based resin and the like.

The cured coating film composed of the resinous composition for foul releasing coat of the present invention is superior in adhesion to various substrates. To enhance the adhesion, a primer layer may optionally be pre-formed on the surface of the substrate before the cured coating film composed of the resinous composition for foul releasing coat is formed. The primer layer is not particularly restricted, and includes, for example, a cured resin layer composed of a primer composition containing at least one resin selected from the group consisting of an alkyd resin, epoxy resin, acrylic resin, acrylsilicon resin, chlorinated rubber resin, urethane resin, phenol resin, polyester resin and melamine resin in an amount of not less than 10% by weight, and the like. The thickness of the primer layer is not particularly restricted, but is preferably from 0.1 to 50 $\mu$m, more preferably from 0.5 to 10 $\mu$m. When the thickness is too thin, adhesion is not obtained, and when too thick, there is a fear that foaming is caused in drying.

Here, a substrate having the organic primer layer as described above on the surface is included in the above-mentioned organic coated substrate.

The shape of the substrate is not particularly restricted, and includes, for example, film form, sheet form, plate form, fiber form and the like. Further, the substrate may be a constituted body partially comprising at least one of the materials in such forms or the molded body.

The cured coating film obtained from the resinous composition for foul releasing coat of the present invention lowers adhesion of foul and the like to the surface of a coated article having this coating film since the coating film has surface water repelling property due to inclusion of the component (C). Therefore, the surface of this coated article is difficult to be adhered with foul and the like, and even if the foul and the like adheres to the surface of the coated article, it is easily removed.

The adhering material such as foul and the like of which adhesion property is lowered by the present invention is not particularly restricted, and includes various polluting materials, for example, dirt and dust in air, exhausted gas, tar of cigarette, graffiti, poster, oil and the like, and in addition to them, adhered materials concerning water, for example, pollution in water supplying system in a house, pollution mixed in rainwater, mud, snow, ice, aquatic organisms in sea and liver and the like (for example, narbacle, plankton, sea lettuce and the like). The present invention has a large adhesion lowering effect especially to aquatic organism among them.

The resinous composition for foul releasing coat and the coated article therewith can be used, for example, in the following uses.

1) Ship, marine construction and the like for which prevention of the adhesion of aquatic organisms is required, for example (example of a substrate), bottoms of general ships (steel plate), leisure boat (FRP), condenser tube of electric power plant (aluminum, iron and the like), and the other marine constructions.

2) Automobile for which water repelling property is required; for example (example of a substrate), a body of a car (organic coated plate), front glass (glass), side mirror (glass), sun roof (polycarbonate), rolling stock of an electric railcar and the like (organic coated plate, stainless), masking film (plastic film) and the like.

3) Prevention of ice accretion; for example (example of a substrate), a roof (inorganic construction material), wing of an airplane (special metal), and the like.

4) Outdoor construction for which prevention of snow accretion is required; for example (example of a substrate), a roof (inorganic construction material), electric wire (organic rubber), sign (organic coated plate, plastic film laminated steel plate), and the like.

5) Road tunnel and sound insulating wall of express-highway; for example (example of a substrate), an interior packaging plate of a tunnel (slate, concrete), guard rail (organic coated plate, galvanized steel plate), sound insulating wall (acryl, polycarbonate, slate, concrete), sign (organic coated plate, plastic film laminated steel plate), road illumination pole (organic coated plate, glass cover), and the like.

6) Around a range for which prevention of oily stain is required; for example (example of a substrate), a range hood (organic coated metal plate), around a range (stainless, enamel, tile), cover film (PET (polyethylene terephthalate), aluminum), closet door (plastic film laminated wood, plastic), range stand (marble, artificial marble), ventilation fan (plastic), kitchen illumination cover (acryl, polycarbonate, organic coated metal plate, glass), refrigerator cover (precoated steel plate, PET film), and the like.

7) General interiors for which prevention of tar pollution of cigarette is required; for example (example of a substrate), a wallpaper (polyvinyl chloride), blind (organic coated plate), illumination light (acryl, polycarbonate, glass), general electric product (precoated steel plate, plastic), and the like.

8) The other objects in a house for which prevention of pollution is required; for example (example of a substrate), a bath (FRP), innerwall of bathroom (FRP steel plate, polyvinyl chloride steel plate), toilet (enamel), toilet seat (plastic), and the like.

9) General outdoor constructions for which high surface endurance is required; for example (example of a substrate), an outerwall (inorganic construction material such as concrete, tile and the like, organic coated plate), gutter (polyvinyl chloride, stainless), tomb (granite), tent (polyvinyl chloride film), various vending machines (organic coated plate), the other general outdoor construction.

10) Outdoor constructions for which prevention of graffiti and poster is required; for example (example of a substrate), bridge pier (steel plate, concrete), public toilet (concrete), outerwall (inorganic construction material such as slate, concrete and the like), public telephone box (glass, film for splash prevention), pole (metal coated plate, concrete), and the like.

11) Objects for which high endurance and water repelling property are required; for example (example of a substrate), a fiber (various fibers), glazing (polycarbonate, acryl), cover of solar battery (glass), sports articles (FRP), and the like.

12) Objects for which wax effect is required; for example (example of a substrate), a ski board (FRP), mold releasing material (metal), releasing paper (paper, plastic film), floor material (FRP, tile), and the like.

The present invention further provides a method of prevention of foul on substrates by applying the resinous composition of the present invention on the substrates as aforementioned. The term "prevention" includes preventing the adhesion of foul, and improving the releasability of foul from coating film on which fouls once adhered.

EXAMPLES

The following Examples and Comparative Examples further illustrate the present invention in detail. In Examples and Comparative Examples all "parts" and "percents" are by weigh unless otherwise stated. And the molecular weight was measured by GPC (gel permeation chromatography) using HLC 8020 available from TOSO Corp. as a measuring device and by preparing a calibration curve using standard polystyrene. The present invention is not restricted to the following Examples.

Before Examples and Comparative Examples, ingredients to be used were prepared as follows.

PREPARATION OF COMPONENT (A)

Preparation Example A-1

Into a flask equipped with a stirrer, heating jacket, condenser and thermometer were charged 100 parts of isopropanol dispersed colloidal silica sol IPA-ST (particle diameter 10 to 20 nm, solid component 30%, water content 0.5%, manufactured by Nissan Chemical Industries, Ltd.), 68 parts of methytrimethoxysilane and 10.8 parts of water, and partial hydrolysis was conducted at 65° C. for about 5 hours with stirring before cooling to obtain a component (A-1). This component had a solid content of 36% when it was allowed to stand for 48 hours at room temperature.

| Preparation condition of A-1 | |
|---|---|
| mol number of water per one mol of a hydrolyzable group | 0.4 |
| silica content of the component (A-1) | 47.3% |
| mol % of a hydrolyzable organosilane (m = 1) | 100% |

Preparation Example A-2

Into a flask equipped with a stirrer, heating jacket, condenser and thermometer were charged 100 parts of isopropanol dispersed colloidal silica sol IPA-ST (particle diameter 10 to 20 nm, solid component 30%, water content 0.5%, manufactured by Nissan Chemical Industries, Ltd.), 68 parts of methytrimethoxysilane, 18 parts of dimethyldimethoxysilane, 2.7 parts of water and 0.1 part of acetic anhydride, and partial hydrolysis was conducted at 80° C. for about 3 hours with stirring before cooling to obtain a component (A-2). This component had a solid content of 36% when it was allowed to stand for 48 hours at room temperature.

| Preparation condition of A-2 | |
|---|---|
| mol number of water per one mol of a hydrolyzable group | 0.1 |
| silica content of the component (A-2) | 40.2% |
| mol % of a hydrolyzable organosilane (m = 1) | 77% |

PREPARATION OF COMPONENT (B)

Preparation Example B-1

In a flask equipped with a stirrer, heating jacket, condenser, dropping funnel, nitrogen gas introducing and discharging port and thermometer, a solution of 0.025 parts of azobisisobutyronitrile in 3 parts of toluene was added dropwise to a reaction solution obtained by dissolving 5.69 parts of n-butyl methacrylate (BMA), 1.24 parts of trimethoxysilylpropyl methacrylate (SMA), 0.71 parts of glycidyl methacrylate (GMA) and further 0.784 parts of γ-mercaptopropyltrimethoxysilane as a chain transfer agent into 8.49 parts of toluene under nitrogen flow, and the resulting mixture was reacted at 70° C. for 2 hours. By this procedure, a 40% toluene solution of an acrylic resin having a weight-average molecular weight Mw of 1000 was obtained. This is referred to as B-1.

| Preparation condition of B-1 | |
|---|---|
| monomer mol ratio | BMA/SMA/GMA =8/1/1 |
| weight-average molecular weight | 1000 |
| solid content | 40% |

Preparation Example B-2

In a flask equipped with a stirrer, heating jacket, condenser, dropping funnel, nitrogen gas introducing and discharging port and thermometer, a solution of 0.025 parts of azobisisobutyronitrile in 3 parts of toluene was added dropwise to a reaction solution obtained by dissolving 4.98 parts of n-butyl methacrylate (BMA), 2.48 parts of trimethoxysilylpropyl methacrylate (SMA), 0.71 parts of glycidyl methacrylate (GMA) and further 0.784 parts of γ-mercaptopropyltrimethoxysilane as a chain transfer agent in 9.26 parts of toluene under nitrogen flow, and the resulting mixture was reacted at 70° C. for 2 hours. By this procedure, a 40% toluene solution of an acrylic resin having a weight-average molecular weight Mw of 1000 was obtained. This is referred to as B-2.

| Preparation condition of B-2 | |
|---|---|
| monomer mol ratio | BMA/SMA/GMA =7/2/1 |
| weight-average molecular weight | 1000 |
| solid content | 40% |

Preparation Example B-3

In a flask equipped with a stirrer, heating jacket, condenser, dropping funnel, nitrogen gas introducing and discharging port and thermometer a solution of 0.025 parts of azobisisobutyronitrile in 3 parts of toluene was added dropwise to a reaction solution obtained by dissolving 5.69 parts of n-butyl methacrylate (BMA), 1.24 parts of trimethoxysilylpropyl methacrylate (SMA), 0.71 parts of glycidyl methacrylate (GMA) and further 0.0392 parts of γ-mercaptopropyltrimethoxysilane as a chain transfer agent in 8.49 parts of toluene under nitrogen flow, and the resulting mixture was reacted at 70° C. for 2 hours. By this procedure, a 40% toluene solution of an acrylic resin having a weight-average molecular weight Mw of 12000 was obtained. This is referred to as B-3.

| Preparation condition of B-3 | |
|---|---|
| monomer mol ratio | BMA/SMA/GMA =8/1/1 |
| weight-average molecular weight | 12000 |
| solid content | 40% |

Preparation Example B-4

The same procedure as that of Preparation Example B-1 was conducted except that γ-mercaptopropyltrimethoxysilane (chain transfer agent) was not used at all in Preparation Example B-1, to obtain a 40% toluene solution of an acrylic resin having a weight-average molecular weight Mw of 36000. This is referred to as B-4.

| Preparation condition of B-4 | |
|---|---|
| monomer mol ratio | BMA/SMA/GMA =8/1/1 |
| weight-average molecular weight | 36000 |
| solid content | 40% |

Comparative Preparation Example B-1

In a flask equipped with a stirrer, heating jacket, condenser, dropping funnel, nitrogen gas introducing and discharging port and thermometer a solution of 0.025 parts of azobisisobutyronitrile in 3 parts of toluene was added dropwise to a reaction solution (containing no trimethoxysilylpropyl methacrylate (SMA) at all) obtained by dissolving 3.56 parts of n-butyl methacrylate (BMA), 3.55 parts of glycidyl methacrylate (GMA) and further 0.784 parts of γ-mercaptopropyltrimethoxysilane as a chain transfer agent in 7.79 parts of toluene under nitrogen flow, and the resulting mixture was reacted at 70° C. for 2 hours. By this procedure, a 40% toluene solution of an acrylic resin having a weight-average molecular weight Mw of 1000 was obtained. This is referred to as comparative B-1.

| Preparation condition of comparative B-1 | |
|---|---|
| monomer mol ratio | BMA/SMA/GMA =5/0/5 |
| weight-average molecular weight | 1000 |
| solid content | 40% |

Comparative Preparation Example B-2

In a flask equipped with a stirrer, heating jacket, condenser, dropping funnel, nitrogen gas introducing and discharging port and thermometer a solution obtained by dissolving 0.025 parts of azobisisobutyronitrile in 3 parts of toluene was added dropwise to a reaction solution (containing no glycidyl methacrylate (GMA) at all) obtained by dissolving 3.56 parts of n-butyl methacrylate (BMA), 6.20 parts of trimethoxysilylpropyl methacrylate (SMA) and further 0.784 parts of γ-mercaptopropyltrimethoxysilane as a chain transfer agent in 11.6 parts of toluene under nitrogen flow, and the resulting mixture was reacted at 70° C. for 2 hours. By this procedure, a 40% toluene solution of an acrylic resin having a weight-average molecular weight Mw of 1000 was obtained. This is referred to as comparative B-2.

| Preparation condition of comparative B-2 | |
|---|---|
| monomer mol ratio | BMA/SMA/GMA =5/5/0 |
| weight-average molecular weight | 1000 |
| solid content | 40% |

COMPONENT C

<C-1>

A linear dimethylpolysiloxane diol having a weight-average molecular weight Mw of 800 in which n in the above-described formula (III) is about 11 (average value). This is referred to as C-1.

<C-2>

A linear dimethylpolysiloxane diol having a weight-average molecular weight Mw of 3000 in which n in the above-described formula (III) is about 40 (average value). This is referred to as C-2.

<C-3>

A linear methylphenylpolysiloxane diol having a weight-average molecular weight Mw of 450 in which n in the above-described formula (III) is about 4 (average value). This is referred to as C-3.

<C-4>

A linear dimethylpolysiloxane diol having a weight-average molecular weight Mw of 7000 in which n in the above-described formula (III) is about 90 (average value). This is referred to as C-4.

<Comparative C-1>

A linear dimethylsilicone oil having a weight-average molecular weight Mw of 3000 in which both ends of the molecule are composed of methyl groups (n is about 40 (average value)). This is referred to as comparative C-1.

Comparative C-2

A linear dimethylpolysiloxane diol which is a dimeric compound in which n in the above-described formula (III) is 2: [HO((CH$_3$)$_2$SiO)$_2$H]

This is referred to as comparative C-2.

PREPARATION OF COMPONENT (D)

Preparation Example D-1

Into a flask equipped with a stirrer, heating jacket, condenser, dropping funnel and thermometer charged with 1000 parts of water and 50 parts of acetone was added dropwise a solution containing 44.8 parts (0.3 mol) of methyltrichlorosilane, 38.7 parts (0.3 mol) of dimethyl dichlorosilane and 84.6 parts (0.4 mol) of phenyltrichlorosilane in 200 parts of toluene under stirring to conduct hydrolysis. The stirring was continued for 40 minutes after completion of the dropping. The reaction solution was transferred into a separating funnel and allowed to stand still, then it was separated into two layers. The lower layer, hydrochloric acid solution was separated and removed, and water and hydrochloric acid remaining in the upper toluene solution of an organopolysiloxane were stripped off under reduced pressure together with excess toluene to obtain a 60% toluene solution of a silanol group-containing polyorganosiloxane having a weight-average molecular weight of about 3000. This is referred to as D-1. The silanol group-containing polyorganosiloxane in this D-1 was identified as a compound represented by formula (IV).

Preparation Example D-2

Into a flask equipped with a stirrer, heating jacket, condenser, dropping funnel and thermometer was charged a solution of 220 parts (1 mol) of methyltriisopropoxysilane in 150 parts of toluene, and to the resulting solution was added dropwise 108 parts of 1% hydrochloric acid solution over 20 minutes, and methyltriisopropoxysilane was hydrolyzed at 60° C. under stirring. The stirring was continued for 40 minutes after completion of the dropping. The reaction solution was transferred into a separating funnel and allowed to stand still, then it was separated into two layers. The mixed solution of water and isopropyl alcohol of the lower layer containing a small amount of hydrochloric acid was separated and removed, and hydrochloric acid remaining in the upper toluene solution of a resin was rinsed out with water, and toluene was further removed under reduced pressure before dilution with isopropyl alcohol, to obtain a 40% isopropyl alcohol solution of a silanol group-containing polyorganosiloxane having a weight-average molecular weight of about 2000. This is referred to as D-2. The silanol group-containing polyorganosiloxane in this D-2 was identified as a compound of formula (IV).

COMPONENT (E)

N-$\beta$-aminoethyl-$\gamma$-aminopropylmethyldimethoxysilane

Examples 1 to 11 and Comparative Examples 1 to 9

Components shown in Tables 1 to 4 were mixed in ratios shown in the same Tables, and all of the resulting mixtures were diluted by isopropanol such that each solid content was 20%, to obtain resinous compositions for foul releasing coat of respective Examples and comparative resinous compositions for coating of respective Comparative Examples.

Example 12

The component A-1 (50 parts), 30 parts of titanium oxide (R-820, manufactured by Ishihara Sangyo K.K.) and 30 parts of glass beads (2 to 3 mm$\phi$) were mixed, and the mixture was ground for 1 hour by a paint-shaker. Then, the glass beads were eliminated, and remaining components shown in Table 2 were added at any time, to obtain a resinous compositions for foul releasing coat.

The appearance of each resinous composition for foul releasing coat obtained was observed by naked eyes. The results are shown in Tables 1 to 4.

Examples 13 to 24 and Comparative Examples 10 to 17

The each composition obtained in Examples 1 to 12 and Comparative Examples 1 to 8 was coated on an aluminum test piece (commercial name: Alustar, manufactured by Nippon Test Panel Corp., dimension 150 mm×70 mm×0.3 mm) by spray coating so that the thickness of the resulting cured coating film would be 10 $\mu$m or 50 $\mu$m, and cured at a temperature of 150° C. for 30 minutes for forming a coating film, to obtain a coated article of each Example and a comparative coated article of each Comparative Example. These coated articles were tested for coating film property by the following method. The results are shown in Tables 5 to 8.

(Evaluation of coating film property):

Adhesion: Adhesion of coated film to a substrate was evaluated by cross cut adhesive tape (using cellophane tape) peeling test.

Hardness of coating film: According to pencil hardness test (according to JIS-K5400).

Boiling water resistance (crack resistance): After the test piece was immersed in boiling tap water for 5 hours, the test piece was allowed to stand for 1 hour. The test piece without change in the appearance was evaluated as "good".

Solvent resistance: A toluene swollen gauze was weakly pressed onto the coating film and the film was rubbed in 100 cycles back and forth movement of the gauze. The test piece without change in the appearance was evaluated as "good".

Release resistance of foul: The release resistance of foul to the coating film was measured by adhesive tape (using cellophane tape) peeling strength (in this case, adhesive agent of the adhesive tape was used as a substitute for the foul (general Adhesive substance)). An adhesive tape with width of 5 mm was applied on a portion of the coating film, then, one end of this tape was peeled off at an angle of 180° relative to the surface of the coating film and the peeling strength was measured (this measurement was conducted before and after the above-mentioned boiling water resistance test). When this strength is small, it is indicated that the pollution substance is easily removed from the surface of the coating film.

Weatherability: The test piece was irradiated by a Sunshine Super Long Life Weather Meter (manufactured by SUGA SHIKENKI K.K., WEL-SUN-HC type) for 2500 hours. When no change was observed in the condition of the coating film, it was admitted excellent.

As is apparent from Tables 5 to 8, the coating films composed of the resinous compositions for foul releasing coat of Examples are excellent in any of adhesion, hardness of the coating film, boiling water resistance (crack resistance), solvent resistance, adhesive strength of stain, and weatherability, as compared with those of Comparative Examples.

Examples 25 to 32 and Comparative Examples 18 to 25

The resinous compositions for foul releasing coat obtained in Example 2 and the comparative resinous compositions for coating obtained in Comparative Example 7 were respectively coated on various substrates by spray coating so that the thickness of the resulting cured coating film was 10 $\mu$m or 50 $\mu$m, and the coated film was cured at a temperature of 80° C. for 60 minutes for forming a coating film, and the resulting films were evaluated for coating film property (excepting hardness of the coating film and weatherability).

The following substrates were used.

Stainless plate: SUS304 plate (dimension 150 mm×70 mm×0.5 mm)

Organic coated plate: thermal setting acrylic resin coated aluminum plate (dimension 150 mm×70 mm×2 mm)

PC plate: polycarbonate plate (dimension 150 mm×70 mm×5 mm)

Slate plate: fiber-reinforced cement plate (dimension 150 mm×70 mm×3 mm)

An epoxy type sealer "Epolo E sealer" (manufactured by ISAMU Toryo K.K.) was used as a primer, if necessary. Though no special problem occurs in adhesion when primer is not used, if sufficient adhesion is required even after treatment in boiling water for 5 hours, it is desired to use a primer.

The results are shown in Tables 9 to 11.

As is apparent from Tables 9 to 11, the coating films composed of the resinous compositions for foul releasing coat of Examples are good in any of adhesion, boiling water resistance (crack resistance), solvent resistance and release resistance of foul, as compared with those of Comparative Examples, irrespective of the kind of the substrate.

TABLE 1

| | solid (%) | amount of ingredients in composition (parts) | | | | | | |
|---|---|---|---|---|---|---|---|---|
| | | Example 1 | Example 2 | Example 3 | Example 4 | Example 5 | Example 6 | Example 7 |
| A-1 | 36 | 50 | 50 | 50 | — | — | 50 | 50 |
| A-2 | 36 | — | — | — | 50 | 50 | — | — |
| B-1 | 40 | 24 | — | — | — | — | — | 12 |
| B-2 | 40 | — | 24 | — | 19 | 19 | 72 | — |
| B-3 | 40 | — | — | 24 | — | — | — | 12 |
| B-4 | 40 | — | — | — | — | — | — | — |
| comparative B-1 | 40 | — | — | — | — | — | — | — |
| comparative B-2 | 40 | — | — | — | — | — | — | — |
| C-1 | 100 | 9.6 | 9.6 | 9.6 | — | 7.6 | 14.4 | — |
| C-2 | 100 | 2.4 | 2.4 | 2.4 | 3.8 | — | 4.8 | 0.96 |
| C-3 | 100 | — | — | — | — | — | — | — |
| C-4 | 100 | — | — | — | — | — | — | — |
| comparative C-1 | 100 | — | — | — | — | — | — | — |
| comparative C-2 | 100 | — | — | — | — | — | — | — |
| D-1 | 60 | 50 | 50 | 50 | — | — | 50 | 50 |
| D-2 | 40 | — | — | — | 50 | 50 | — | — |
| E | 100 | 2 | 2 | 2 | 2 | 2 | 3 | 2 |
| pigment | 100 | — | — | — | — | — | — | — |
| appearance of composition | — | colorless clear/no muddiness/ no phase separation | colorless clear/no muddiness/ no phase sepatation | colorless clear/no muddiness/ no phase separation | colorless clear/no muddiness/ no pbase separation | colorless clear/no muddiness/ no phase separation | colorless clear/no muddiness/ no phase separation | colorless clear/no muddiness/ no phase separation |

TABLE 2

| | solid (%) | amount of ingedients in composition (parts) | | | | |
|---|---|---|---|---|---|---|
| | | Example 8 | Example 9 | Example 10 | Example 11 | Example 12 |
| A-1 | 36 | 50 | 50 | 50 | 50 | 50 |
| A-2 | 36 | — | — | — | — | — |
| B-1 | 40 | 108 | 12 | — | 24 | 24 |
| B-2 | 40 | — | — | — | — | — |
| B-3 | 40 | — | — | — | — | — |
| B4 | 40 | — | — | 1.2 | — | — |
| comparative B-1 | 40 | — | — | — | — | — |
| comparative B-2 | 40 | — | — | — | — | — |
| C-1 | 100 | — | — | 9.6 | 9.6 | 9.6 |
| C-2 | 100 | 2.4 | 2.4 | 2.4 | 2.4 | 2.4 |
| C-3 | 100 | — | 44 | — | — | — |
| C-4 | 100 | — | — | — | 0.24 | — |
| comparative C-1 | 100 | — | — | — | — | — |
| comparative C-2 | 100 | — | — | — | — | — |
| D-1 | 60 | 50 | 50 | 50 | 50 | 50 |
| D-2 | 40 | — | — | — | — | — |
| E | 100 | 4 | 4 | 2 | 2 | 2 |
| pigment | 100 | — | — | — | — | 30 |
| appearance of composition | — | colorless clear/no muddiness/ no phase separation | colorless clear/no muddiness/ no phase scparation | colorless clear/no muddiness/ no phase separation | colorless clear/no muddiness/ no phase separation | no precipitation of pigment |

TABLE 3

| | solid (%) | amount of ingredients in composition (parts) | | | | |
|---|---|---|---|---|---|---|
| | | Comparative Example 1 | Comparative Example 2 | Comparative Example 3 | Comparative Example 4 | Comparative Example 5 |
| A-1 | 36 | 50 | 50 | 50 | 50 | — |
| A-2 | 36 | — | — | — | — | — |
| B-1 | 40 | — | — | — | — | — |
| B-2 | 40 | 24 | 24 | 24 | — | 24 |
| B-3 | 40 | — | — | — | — | — |

TABLE 3-continued

| | | amount of ingredients in composition (parts) | | | | |
|---|---|---|---|---|---|---|
| | solid (%) | Comparative Example 1 | Comparative Example 2 | Comparative Example 3 | Comparative Example 4 | Comparative Example 5 |
| B-4 | 40 | — | — | — | — | — |
| comparative B-1 | 40 | — | — | — | — | — |
| comparative B-2 | 40 | — | — | — | — | — |
| C-1 | 100 | 9.6 | 9.6 | — | 9.6 | 9.6 |
| C-2 | 100 | 2.4 | 2.4 | — | 2.4 | 2.4 |
| C-3 | 100 | — | — | — | — | — |
| C-4 | 100 | — | — | — | — | — |
| comparative C-1 | 100 | — | — | — | — | — |
| comparative C-2 | 100 | — | — | — | — | — |
| D-1 | 60 | 50 | — | 50 | 50 | 50 |
| D-2 | 40 | — | — | — | — | — |
| E | 100 | — | 2 | 2 | 2 | 2 |
| pigment | 100 | — | — | — | — | — |
| appearance of composition | — | colorless clear/no muddiness/ no phase separation | colorless clear/no muddiness/ no phase separation | colorless clear/no muddiness/ no phase separation | colorless clear/no muddiness/ no phase separation | colorless clear/no muddiness/ no phase separation |

TABLE 4

| | | amount of ingredients in composition (parts) | | | |
|---|---|---|---|---|---|
| | solid (%) | Comparative Example 6 | Comparative Example 7 | Comparative Example 8 | Comparative Example 9 |
| A-1 | 36 | 50 | 50 | 50 | 50 |
| A-2 | 36 | — | — | — | — |
| B-1 | 40 | — | — | — | — |
| B-2 | 40 | — | — | 24 | 24 |
| B-3 | 40 | — | — | — | — |
| B-4 | 40 | — | — | — | — |
| comparative B-1 | 40 | 24 | — | — | — |
| comparative B-2 | 40 | — | 24 | — | — |
| C-1 | 100 | 9.6 | 9.6 | — | — |
| C-2 | 100 | 2.4 | 2.4 | — | — |
| C-3 | 100 | — | — | — | — |
| C-4 | 100 | — | — | — | — |
| comparative C-1 | 100 | — | — | — | 44 |
| comparative C-2 | 100 | — | — | 9.6 | — |
| D-1 | 60 | 50 | 50 | 50 | 50 |
| D-2 | 40 | — | — | — | — |
| E | 100 | 2 | 2 | 2 | 4 |
| pigment | 100 | — | — | — | — |
| appearance of composition | — | muddy | colorless clear/ no muddi- ness/ no phase separation | colorless clear/ no muddi- ness/ no phase separation | gelation |

TABLE 5

| | | Example 13 | Example 14 | Example 15 | Example 16 | Example 17 | Example 18 | Example 19 |
|---|---|---|---|---|---|---|---|---|
| substrate | | aluminum plate | aluminum plate | aluminum plate | aluminum plate | aluminum plate | aluminum plate | aluminum plate |
| resinous composition for coating | | Example 1 | Example 2 | Example 3 | Example 4 | Example 5 | Example 6 | Example 7 |
| primer | | non | non | non | non | non | non | non |
| adhesion | 10 μm | 100/100 | 100/100 | 100/100 | 100/100 | 100/100 | 100/100 | 100/100 |
| | 50 μm | 100/100 | 100/100 | 100/100 | 100/100 | 100/100 | 100/100 | 100/100 |
| pencil hardness | 10 μm | 2H | 2H | 2H | 2H | 2H | 1H | 2H |
| | 50 μm | 2H | 1H | 1H | 2H | 2H | F | 1H |
| boiling water resistance | 10 μm | good | good | good | good | good | good | good |
| | 50 μm | good | good | good | good | good | good | good |
| solvent resistance | 10 μm | good | good | good | good | good | good | good |
| | 50 μm | good | good | good | good | good | good | good |

TABLE 5-continued

|  |  | Example 13 | Example 14 | Example 15 | Example 16 | Example 17 | Example 18 | Example 19 |
|---|---|---|---|---|---|---|---|---|
| release resistance of foul (gf/50 mm) | 10 μm | before 3.2 after 3.8 | before 3.5 after 3.8 | before 3.0 after 3.5 | before 2.5 after 3.5 | before 5.5 after 7.0 | before 2.6 after 3.2 | before 4.8 after 7.8 |
| weatherability | 10 μm | good | good | good | good | good | good | good |
|  | 50 μm | good | good | good | good | good | good | good |

TABLE 6

|  |  | Example 20 | Example 21 | Example 22 | Example 23 | Example 24 |
|---|---|---|---|---|---|---|
| substrate |  | aluminum plate | aluminum plate | aluminum plate | aluminum plate | aluminum plate |
| resinous composition for coating |  | Example 8 | Example 9 | Example 10 | Example 11 | Example 12 |
| primer |  | non | non | non | non | non |
| adhesion | 10 μm | 100/100 | 98/100 | 46/100 | 100/100 | 100/100 |
|  | 50 μm | 100/100 | 95/100 | 94/100 | 100/100 | 100/100 |
| pencil hardness | 10 μm | HB | F | 2H | 2H | 3H |
|  | 50 μm | HB | HB | 1H | 1H | 3H |
| boiling water resistance | 10 μm | good | good | good | good | good |
|  | 50 μm | good | good | good | good | good |
| solvent resistance | 10 μm | good | good | good | good | good |
|  | 50 μm | good | good | good | good | good |
| release resistance of foul (gf/50 mm) | 10 μm | before 5.8 after 6.8 | before 7.0 after 10.5 | before 3.8 after 4.5 | before 2.5 after 3.1 | before 2.1 after 2.4 |
| weatherability | 10 μm | good | good | good | good | good |
|  | 50 μm | good | good | good | good | good |

TABLE 7

|  |  | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|
| substrate |  | aluminum plate | aluminum plate | aluminum plate | aluminum plate | aluminum plate | aluminum plate | aluminum plate |
| resinous composition for coating |  | Comparative Example 1 | Comparative Example 2 | Comparative Example 3 | Comparative Example 4 | Comparative Example 5 | Comparative Example 6 | Comparative Example 7 |
| primer |  | non | non | non | non | non | non | non |
| adhesion | 10 μm | 30/100 | 20/100 | 100/100 | 80/100 | 30/100 | 100/100 | 80/100 |
|  | 50 μm | 10/100 | 15/100 | 100/100 | 50/100 | 10/100 | 100/100 | 60/100 |
| pencil hardness | 10 μm | <2B | <2B | 2H | 2H | <2B | HB | 2H |
|  | 50 μm | <2B | <2B | 1H | 1H | <2B | 1B | 1H |
| boiling water resistance | 10 μm | crack/peeling | crack/peeling | good | partial peeling | crack/peeling | muddy | partial peeling |
|  | 50 μm | crack/peeling | crack/peeling | good | crack/peeling | crack/peeling | muddy | crack/peeling |
| solvent resistance | 10 μm | swelling | swelling | good | good | swelling | swelling | good |
|  | 50 μm | swelling | swelling | good | good | swelling | swelling | god |
| release resistance of foul (hg/50 mm) | 10 μm | before 50 after — | before 80 after — | before 475 after 520 | before 3.2 after 3.8 | before 45 after — | before 10 after 6.2 | before 5.0 after 6.2 |
| weatherabity | 10 μm | — | — | good | partial peeling | — | muddy | partial peeling |
|  | 50 μm | — | — | good | peeling | — | muddy | peeling |

TABLE 8

|  | Comparative Example 17 |
|---|---|
| substrate | aluminum plate |
| resinous composition for coating | Comparative Example 8 |
| primer | non |
| adhesion |  |
| 10 μm | 100/100 |
| 50 μm | 100/100 |
| pencil hardness |  |
| 10 μm | 2H |
| 50 μm | 1H |
| boiling water resistance |  |
| 10 μm | good |
| 50 μm | good |
| solvent resistance |  |
| 10 μm | good |
| 50 μm | good |
| release resistance of foul (gf/50 mm) |  |
| 10 μm |  |
| before | 3.8 |
| after | 240 |
| weatherability |  |
| 10 μm | good |
| 50 μm | good |

TABLE 9

|  |  | Example 25 | Example 26 | Example 27 | Example 28 | Example 29 | Example 30 | Example 31 |
|---|---|---|---|---|---|---|---|---|
| substrate |  | stainless plate | stainless plate | acryl resin coated plate | acryl resin coated plate | PC plate | PC plate | slate plate |
| resinous composition for coating |  | Example 2 | Example 2 | Example 2 | Example 2 | Example 2 | Example 2 | Example 2 |
| primer |  | non | yes | non | yes | non | yes | non |
| adhesion | 10 μm | 100/100 | 100/100 | 100/100 | 100/100 | 100/100 | 100/100 | 100/100 |
|  | 50 μm | 95/100 | 100/100 | 94/100 | 100/100 | 95/100 | 100/100 | 100/100 |
| boiling water | 10 μm | partial peeling | good | good | good | good | good | partial peeling |
| resistance | 50 μm | partial peeling | good | partial peeling | good | partial peeling | good | partial peeling |
| solvent resistance | 10 μm | good | good | good | good | good | good | good |
|  | 50 μm | good | good | good | good | good | good | good |
| release resistance of foul (gf/50 mm) | 10 μm | before 3.4 after 4.0 | before 3.5 after 4.2 | before 3.3 after 3.8 | before 3.8 after 4.2 | before 3.5 after 4.0 | before 3.5 after 4.2 | before 3.2 after 4.0 |

TABLE 10

|  |  | Example 32 | Comparative Example 18 | Comparative Example 19 | Comparative Example 20 | Comparative Example 21 | Comparative Example 22 | Comparative Example 23 |
|---|---|---|---|---|---|---|---|---|
| substrate |  | slate plate | stainless plate | stainless plate | acryl resin coated plate | acryl resin coated plate | PC plate | PC plate |
| resinous composition for coating |  | Example 2 | Comparative Example 7 | Comparative Example 7 | Comparative Example 7 | Comparative Example 7 | Comparative Example 7 | Comparative Example 7 |
| primer |  | yes | non | yes | non | yes | non | yes |
| adhesion | 10 μm | 100/100 | 50/100 | 100/100 | 70/100 | 100/100 | 50/100 | 100/100 |
|  | 50 μm | 100/100 | 20/100 | 100/100 | 50/100 | 100/100 | 30/100 | 100/100 |
| boiling water | 10 μm | good | peeling | good | peeling | good | peeling | good |
| resistance | 50 μm | good | peeling | good | peeling | good | peeling | good |
| solvent resistance | 10 μm | good | good | good | good | good | good | good |
|  | 50 μm | good | good | good | good | good | good | good |
| release resistance of foul (gf/50 mm) | 10 μm | before 3.4 after 4.0 | before 4.0 after — | before 5.5 after 7.0 | before 5.6 after — | before 5.0 after 7.5 | before 5.5 after — | before 5.8 after 8.0 |

TABLE 11

|  | Comparative Example 24 | Comparative Example 25 |
|---|---|---|
| substrate | slate plate | slate plate |
| resinous composition for coating | Comparative Example 7 | Comparative Example 7 |
| primer | non | yes |
| adhesion |  |  |
| 10 μm | 30/100 | 100/100 |
| 50 μm | 10/100 | 100/100 |
| boiling water resistance |  |  |
| 10 μm | peeling | good |
| 50 μm | peeling | good |
| solvent resistance |  |  |
| 10 μm | good | good |
| 50 μm | good | good |
| release resistance of foul (gf/50 mm) |  |  |
| 10 μm |  |  |
| before | 5.2 | 4.8 |
| after | — | 6.4 |

(Effect of the invention)

The resinous composition for foul releasing coat of the present invention can form a cured coating film having high hardness and high weatherability and excellent in solvent resistance, boiling water resistance and the like, on the surface of various substrates whether it is inorganic or organic. This cured coating film is excellent in adhesion to inorganic or organic various substrates even if no primer used. This cured coating film does not easily cause cracking when the thickness thereof is not more than the maximum value of about 50 μm (excellent in cracking resistance), has wide adaptability against the unevenness of the substrate, and can cope with the change in dimension of the substrate influenced by temperature or humidity, since it has no too high hardness and excellent in toughness (flexibility). Further, the hardness of this cured coating film is not too low.

The cured coating film obtained from the resinous composition for foul releasing coat of the present invention has effect to lower adhesion of stain or the like to the surface thereof, since it has surface water repelling property. Therefore, the surface thereof is difficultly fouled with stain and the like, and even if the surface is fouled, it can be easily released. This cured coating film has washing resistance that the surface is difficultly scratched when stain or the like is removed from the surface, since it has appropriately high surface hardness.

The resinous composition for foul releasing coat of the present invention can be used in wide dry curing condition range or temperature range, since curing by heat acceleration at a low temperature less than 100° C. or curing at room temperature is possible. Therefore, even when coating is applied to a substrate having shape which uniform heating is difficult, a substrate having large scale or a substrate inferior in heat resistance, or even when heating is difficult such as coating work outdoors, coating is possible. Thus the resinous composition of the present invention is valuable in the industrial use.

The resinous composition of the present invention can be optionally colored by adding a pigment, since it can be used as a vehicle when a paint is going to be prepared by addition of a pigment.

The coated article of the present invention has high surface hardness and high weatherability and excellent in solvent resistance, boiling water resistance and the like, since the cured coating film composed of the above-mentioned resinous composition for foul releasing coat is coated thereon. The above-mentioned cured coating film is excellent in adhesion to inorganic and organic various substrates, even if no primer is used. The above-mentioned cured coating film is not easily cracked at a thickness of about 50 μm or less (excellent in cracking resistance), has wide adaptability to the unevenness of the substrate, and can cope with the change in dimension of the substrate influenced by temperature or humidity, since it has no too high hardness and excellent in toughness (flexibility). Further, the hardness of this cured coating film is not too low.

The above-mentioned cured coating film composed of the resinous composition for foul releasing coat on the coated article of the present invention is not easily fouled with stain or the like on the surface thereof, since it has surface water repelling property. Therefore, in the coated article of the present invention, the surface thereof is difficultly fouled with stain and the like, and even if the surface is fouled, it can be easily released. Further, this cured coating film has washing resistance so that the surface is difficultly scratched when the foul is released from the surface because of its appropriately high surface hardness.

The coated article of the present invention can be produced in wide dry curing condition range or temperature range, since it can be produced using the above-mentioned resinous composition for foul releasing coat which can be cured by heat acceleration at a temperature lower than 100° C. or can be cured at room temperature. Therefore, since there can be used a substrate having shape which uniform heating is difficult, a large substrate or a substrate of low heat resistance, and since it can be produce in working site where heating is difficult such as outdoors, the industrial value of the coated article of the present invention is high.

The coated article of the present invention has high designing ability and wide use range, since it can be produced by using the resinous composition for foul releasing coat of the present invention which can be optionally colored by adding a pigment because it can be used as a vehicle when a paint is going to be prepared by addition of pigments.

What we claim is:

1. A resinous composition for foul releasing coat comprising the following components (A), (B), (C), (D) and (E):

component (A):
a silica-dispersed oligomer solution of an organosilane obtained by partial hydrolysis of a hydrolyzable organosilane represented by formula (I):

$$R^1{}_m SiX_{4-m} \tag{I}$$

wherein, $R^1$ is the same or a different substituted or unsubstituted monovalent hydrocarbon group having 1 to 8 carbon atoms, m is an integer from 0 to 3, and X is a hydrolyzable group, in a colloidal silica dispersed in an organic solvent, water or mixture solvent thereof in the presence of water, component (B):
an acrylic resin which is a copolymer of
the first, the second and the third (meth)acrylate represented by formula (II):

$$CH_2=CR^2(COOR^3) \tag{II}$$

wherein in the first (meth)acrylate; $R^2$ is a hydrogen atom and/or methyl group, and $R^3$ is a substituted or unsubstituted monovalent hydrocarbon group having 1 to 9 carbon atoms;

in the second (meth)acrylate, $R^2$ is as defined above, and $R^3$ is at least one group selected from the group consisting of an epoxy group, glycidyl group and a hydrocarbon group containing at least one of an epoxy group and glycidyl group; and in the third (meth)acrylate, $R^2$ is as defined above, and $R^3$ is a hydrocarbon group containing an alkoxy silyl group and/or silyl halide group;

component (C):
a linear polysiloxane diol represented by formula (III):

$$HO(R^4{}_2SiO)_n H \tag{III}$$

wherein $R^4$ is the same or different monovalent hydrocarbon group and n is an integer of not less than 3, component (D):
a polyorganosiloxane containing a silanol group in the molecule represented by formula (IV):

$$R^5{}_a Si(OH)_b O_{(4-a-b)/2} \tag{IV}$$

wherein $R^5$ is the same or different substituted or unsubstituted monovalent hydrocarbon group having 1 to 8 carbon atoms, and a and b are a number which respectively suffices $0.2 \leq a < 2$, $0.0001 \leq b \leq 3$ and $a+b<4$, and component (E):
a curing catalyst.

2. The resinous composition for foul releasing coat according to claim 1, wherein said component (B) has a weight-average molecular weight from 1000 to 50000 in terms of a polystyrene according to a gel permeation chromatography.

3. The resinous composition for foul releasing coat according to claim 1 or 2, wherein the amount of the component (B) is from 0.1 to 100 parts by weight based on 100 parts by weight of the total amount of said components (A) and (D) in solid.

4. The resinous composition for foul releasing coat according to claim 1, wherein n in formula (III) is in the range of $10 \leq n \leq 100$.

5. The resinous composition for foul releasing coat according to claim 1, wherein the amount of said component (C) is from 0.1 to 100 parts by weight based on 100 parts by weight of the total amount of the components (A) and (D) in solid.

6. The resinous composition for foul releasing coat according to claim 1, wherein the amount of the colloidal silica is from 5 to 95 parts by weight as a silica based on 100 parts by weight in terms of silica calculated from the amount of hydrolyzable organosilane for formula (I).

7. The resinous composition for foul releasing coat according to claim 1, wherein the amount of component (A) is 1 to 99 parts by weight based on 100 parts by weight of the total amount of the components (A) and (B) in solid.

8. The resinous composition for foul releasing coat according to claim 1, wherein the amount of colloidal silica in the resinous composition is 1 to 40% by weight based on the total solid of the resinous composition.

9. A coated article having a cured coating film composed of the resinous composition for foul releasing coat of claim 1 on a surface of a substrate.

10. A coated article according to claim 9, wherein said substrate is selected from the group consisting of an inorganic substrate, organic substrate and organic coated substrate having an organic coating film on the surface of either inorganic substrate or organic substrate.

11. A method of prevention of foul on substrates, which comprises coating a resinous composition for foul releasing coat of claim 1.

* * * * *